(12) United States Patent
Francis et al.

(10) Patent No.: US 7,877,561 B2
(45) Date of Patent: Jan. 25, 2011

(54) METHOD AND SYSTEM FOR COPYING THE DATA CONTENTS OF A COMPUTER SYSTEM MEMORY DURING APPLICATION PROGRAM RUN-TIME

(75) Inventors: Huw Francis, Compton (GB); Colin R. Jewell, Southampton (GB); Simon Walsh, Hayling Island (GB)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 11/091,261

(22) Filed: Mar. 28, 2005

(65) Prior Publication Data

US 2005/0228960 A1    Oct. 13, 2005

(30) Foreign Application Priority Data

Apr. 13, 2004  (GB) ................................. 0408137.8

(51) Int. Cl.
*G06F 12/00* (2006.01)
(52) U.S. Cl. ................. 711/162; 711/165; 711/E12.019
(58) Field of Classification Search .................. 711/165
See application file for complete search history.

(56) References Cited

U.S. PATENT DOCUMENTS

| | | | | |
|---|---|---|---|---|
| 5,758,151 A | * | 5/1998 | Milligan et al. ..................... | 1/1 |
| 5,809,542 A | * | 9/1998 | Tsuboi et al. ................ | 711/162 |
| 5,875,479 A | * | 2/1999 | Blount et al. ................ | 711/162 |
| 6,564,219 B1 | | 5/2003 | Lee et al. | |
| 6,732,245 B2 | * | 5/2004 | Kaiya et al. .................. | 711/162 |
| 6,799,258 B1 | * | 9/2004 | Linde .......................... | 711/162 |
| 7,103,737 B1 | * | 9/2006 | Kekre et al. .................. | 711/161 |
| 7,165,156 B1 | * | 1/2007 | Cameron et al. ............. | 711/162 |
| 2002/0188815 A1 | * | 12/2002 | Wang et al. .................. | 711/162 |

* cited by examiner

*Primary Examiner*—Matt Kim
*Assistant Examiner*—Ryan Dare
(74) *Attorney, Agent, or Firm*—Griffiths & Seaton PLLC

(57) ABSTRACT

The present invention relates to methods of copying and updating data in a processor memory during program runtime without suspending the program's access to its data in the memory during the data-copying and updating processes. In one aspect, the invention concerns a method of copying data from processor memory to a dump memory during runtime, including determining whether data in a segment of the processor memory is to be updated by a program and copying the data to a corresponding segment in the dump memory prior to the data being updated. According to one embodiment, a data-copying instance is utilized to obtain a point-in-time image of a data content of processor memory while the program is running.

18 Claims, 6 Drawing Sheets

METHOD AND SYSTEM FOR COPYING THE DATA CONTENTS OF A COMPUTER SYSTEM MEMORY DURING APPLICATION PROGRAM RUN-TIME

PRIORITY CLAIM

This application claims priority of United Kingdom Patent Application No. 0408137.8 filed on Apr. 13, 2004, and entitled "A Method and System for Copying the Data Contents of a Computer System Memory During Application Program Run-Time."

BACKGROUND OF THE INVENTION

1. Technical Field

The present invention relates to a method and system for copying the data contents of a computer system processor memory during application program run-time without suspending application program access to data stored in the memory during the data-copying process.

2. Description of the Related Art

In data processing environments, computer systems employ processors to execute application programs. In the case of a stand-alone computer such as a personal computer (PC), for example, this may comprise a word-processing application, an accounting application, a desk-top publishing application or a plurality of the same or similar applications running concurrently on the PC. An application program operates on one or more logical objects that comprise logically related blocks of data associated with that program. Such data is stored on a suitable local storage device such as a hard disk, a soft disk or a tape or on a remote storage medium such as a database or a server where the PC is connected to a network.

When an application program performs an operation on a logical object, it reads the related blocks of data for that object from the storage device and writes the data to a memory associated with the processor. The data is temporarily stored in the processor memory while the application program performs operations on the logical object. When the application program has finished performing operations on the logical object, it reads the data (logical object) associated with that application program from the processor memory and writes the (updated) data to the storage device.

Where the computer system comprises a cluster of networked computing nodes (devices), execution of an application program may be performed on a single computing node or distributed between a number of the computing nodes, but the process of executing an application program and writing data to and reading data from a processor memory or memories is logically the same as in the case with running an application program on a stand-alone PC.

Computer systems often include a control application program that is continuously or periodically executed to record control data indicative of system events and/or operating parameters. The control application program is executed in association with other application programs.

In the event of a problem or error occurring in the computer system, it is desirable to be able to obtain a consistent point-in-time image of the computer system's processor memory or memories to allow the problem or error to be determined and rectified.

A known method of obtaining a point-in-time image of control and/or application program run-time data from a processor memory comprises a process known as "quiescing." This process comprises pausing or stopping all currently running programs in order to prevent their accessing the processor memory and then implementing a dump of the data contents of the processor memory to another memory or storage device. It is necessary to suspend access to the processor memory during the dumping (copying) process in order to prevent the memory contents changing (being modified/updated) during the dumping process which would otherwise corrupt the data and render it useless as a point-in-time image of the processor memory data content.

A disadvantage with the quiescing process is that the time taken to complete the data dumping process constitutes system downtime for the affected application programs and may thus constitute an unacceptable interruption to service. While such an interruption to service is rarely a critical issue when using a stand-alone PC, such interruptions can be critical to the operation of a computer network whose functions may include providing continuous, uninterrupted service.

One solution to the problem of system downtime during a quiescing process is to copy only a portion of the processor memory at any one time. However, this still requires that those application programs accessing that portion of the processor memory are paused or stopped for the duration of the quiescing process which still constitutes system downtime for those applications albeit of a shorter duration than the case where the whole processor memory is being dumped.

An alternative solution to copying the whole of the data contents of a processor memory to obtain a snap-shot (point-in-time) image of the memory is disclosed in U.S. Pat. No. 6,564,219 issued to EMC Corporation. U.S. Pat. No. 6,564,219 proposes a process of obtaining a snap-shot image of the data content of a processor memory by copying only those data elements that have changed since a reference point-in-time where the data content of the memory was known. By copying only those data elements that have changed since the reference point-in-time, this enables the whole of the current data content of the memory to be known. While the process of copying only those data elements that have changed since a reference point-in-time greatly speeds up the quiescing process, it still requires the application programs to be paused or stopped for the duration of the process.

The process disclosed in U.S. Pat. No. 6,564,219 can equally be applied to a selected portion of a processor memory associated with one or more application programs which further speeds up the quiescing process with respect to the one or more application programs, but the disadvantage remains that access to that portion of the processor memory is denied the applications during the data dumping process.

SUMMARY OF THE INVENTION

According to a first aspect of the present invention, there is provided a method of copying data from a first memory means to a second memory means in a computer system during a program run-time, characterised in that it comprises determining whether data in a segment of the first memory means is to be modified by the program; and, if it is determined that data in the segment is to be modified by the program, then copying the data to a corresponding segment of the second memory means prior to the data being modified.

The method comprises a data-copying instance for obtaining a point-in-time image of a data content of the first memory means associated with the running program.

Consequently, in a computer system in which a program is being executed by a processor and data associated with the running program is being temporarily stored on a memory means associated with the processor, a method embodiment of the invention enables a point-in-time image of the data to be obtained while still allowing the running program to access the processor memory and update the data (logical objects) associated with it in the processor memory means. Thus, there is no interruption of service in contrast with the known method of quiescing a memory's data content to obtain a point-in-time data image.

Preferably, the method comprises sequentially copying data from segments of the first memory means to corresponding segments of the second memory means and, if it is determined that data in a segment later in the sequence of segments than the segment currently being copied is to be modified, copying the data from the segment later in the sequence to a corresponding segment of the second memory means prior to the data being modified.

Sequentially copying the data content of segments of the first memory means is an ordered process of obtaining a point-in-time image of the memory means' data content, but by leaping forward in the sequence to copy the data of an out of sequence memory segment whose data content is about to be updated by the running program ensures the running program is allowed to access its data in the first (processor) memory means while a data-copying instance is progressing.

The step of determining whether data in a segment in the first memory means is to be modified may comprise checking a bit in a bit-map or bit-array associated with the first memory means, where the bit corresponds to the segment of the first memory means.

This provides an efficient mechanism by which the method of the invention can control a running program's access to its data in a processor memory while a data-copying instance is in progress.

Preferably, one method embodiment includes copying the data in a segment of the first memory means to a corresponding segment of the second memory means when the result of checking the bit in the bit-map corresponding to that segment determines that the data has not already been copied during that copying instance; and, once the data has been copied, setting the bit in the bit-map to show that the data in the segment has been copied.

Preferably also, the described method includes copying the data content of a segment of the first memory means to a corresponding segment of the second memory means if checking the bit in the bit-map corresponding to that segment determines that the data has already been copied during that copying instance.

Preferably further, the bits of the bit-map are all initially set to show that data in their corresponding segments in the first memory means have not yet been copied.

According to a second aspect of the present invention, there is provided a method of updating data associated with a running program on a computer system, the data being stored in a processor memory means, the method being characterised in that it comprises determining whether a data-copying instance has been initiated to obtain a point-in-time image of data in the processor memory means associated with the running program; and, where it is determined that a data-copying instance has not been initiated, updating the data in the processor memory means.

Preferably, where it is determined that a data-copying instance is in progress, the method includes determining whether data in a segment of the processor memory means is to be updated by the running program; if it is determined that data in the segment is to be updated by the running program, copying the data to a corresponding segment of a second memory means prior to the data being updated; and then updating the data in the segment of the processor memory means.

Preferably also, the method includes determining whether data in a segment of the processor memory means has already been dumped (copied) during that data-copying instance prior to determining if it is to be updated by the running program and, where it is determined that the data of the segment has already been dumped, skipping determining whether the data of the segment is to be updated and updating the data in that segment of the processor memory means.

Preferably further, determining whether data in a segment of the processor memory means has already been dumped during that data-copying instance comprises checking a bit in a bit-map associated with the processor memory means, where the bit corresponds to the segment of the processor memory means.

The method may include sequentially copying data from segments of the processor memory means to corresponding segments of the second memory means and, if it is determined that data in a segment later in the sequence of segments than the segment currently being copied is to be updated by the running program, then copying the data from the segment later in the sequence to a corresponding segment of the second memory means prior to the data being updated.

According to a third aspect of the present invention, there is provided a computer readable medium encoded with a computer program for execution by a processor of a computing system for implementing the method of dumping data from a first memory means to a second memory means in accordance with the appended claims.

According to a fourth aspect of the present invention, there is provided a computer readable medium encoded with a computer program for execution by a processor of a computer system for implementing the method of updating a data entry in a processor memory means in accordance with the appended claims.

According to a fifth aspect of the present invention, there is provided a computer system comprising: a processor for running a program; a processor memory means for temporarily storing data associated with the program running on the processor; characterised in that the processor is enabled to execute a copying-instance function to obtain a point-in-time image of data stored in the processor memory means associated with the running program whereby the processor executes the copying-instance function to determine whether data in a segment of the processor memory means is to be updated by the running program; and, if it is determined that data in the segment is to be updated by the running program, then causing the data to be copied to a corresponding segment in a dump memory means prior to the data being updated.

Preferably, the processor executes the copying-instance function to sequentially copy data from segments of the processor memory means to corresponding segments of the dump memory means and, if it is determined that data in a segment later in the sequence of segments than the segment currently being copied is to be updated, then it copies the data from the segment later in the sequence to a corresponding segment of the dump memory means prior to the data being updated.

According to a sixth aspect of the present invention, there is provided a computer system comprising: a processor for running a program; a processor memory means for temporarily storing data associated with the program running on the processor; characterised in that the processor is enabled to execute a data updating function to update data associated with the running program in the processor memory means whereby the processor executes the data updating function to determine whether a data-copying instance has been initiated to obtain a point-in-time image of data in the processor memory means associated with the running program; and, where it is determined that a data-copying instance has not been initiated, updates the data in the processor memory means.

Preferably, the processor executes the data updating function such that, where it is determined that a data-copying instance is in progress, it determines whether data in a segment of the processor memory means is to be updated by the running program. If it is determined that data in the segment is to be updated by the running program, then it copies the data to a corresponding segment of a dump memory means prior to the data being updated, and then updates the data in the segment of the processor memory means.

DETAILED DESCRIPTION OF ILLUSTRATIVE EMBODIMENT

Computer systems can take many forms from a stand-alone personal computer (PC) to a PC connected either permanently or intermittently to a network such as the Internet or to a cluster of PCs and/or more powerful computers interconnected by a private and/or public network. What all such systems have in common is their use of processors within one or more computing devices comprising the computer system to execute application programs and their associated processor memories for temporarily storing data (logical objects) associated with the programs while the data is being operated on by the programs.

In computer systems, back-ups of data may be made for various reasons including disaster recovery, security, diagnostics etc. Such back-ups may be of the data files (logical objects) that the application programs operate on but can also comprise point-in-time (snap-shot) images of the control and/or the application program run-time data that is temporarily stored in the processor memories during application run-time.

The foregoing and further features of the present invention will be more readily understood from the following description, by way of example only, with reference to FIGS. 1 to 6.

Figure 1:
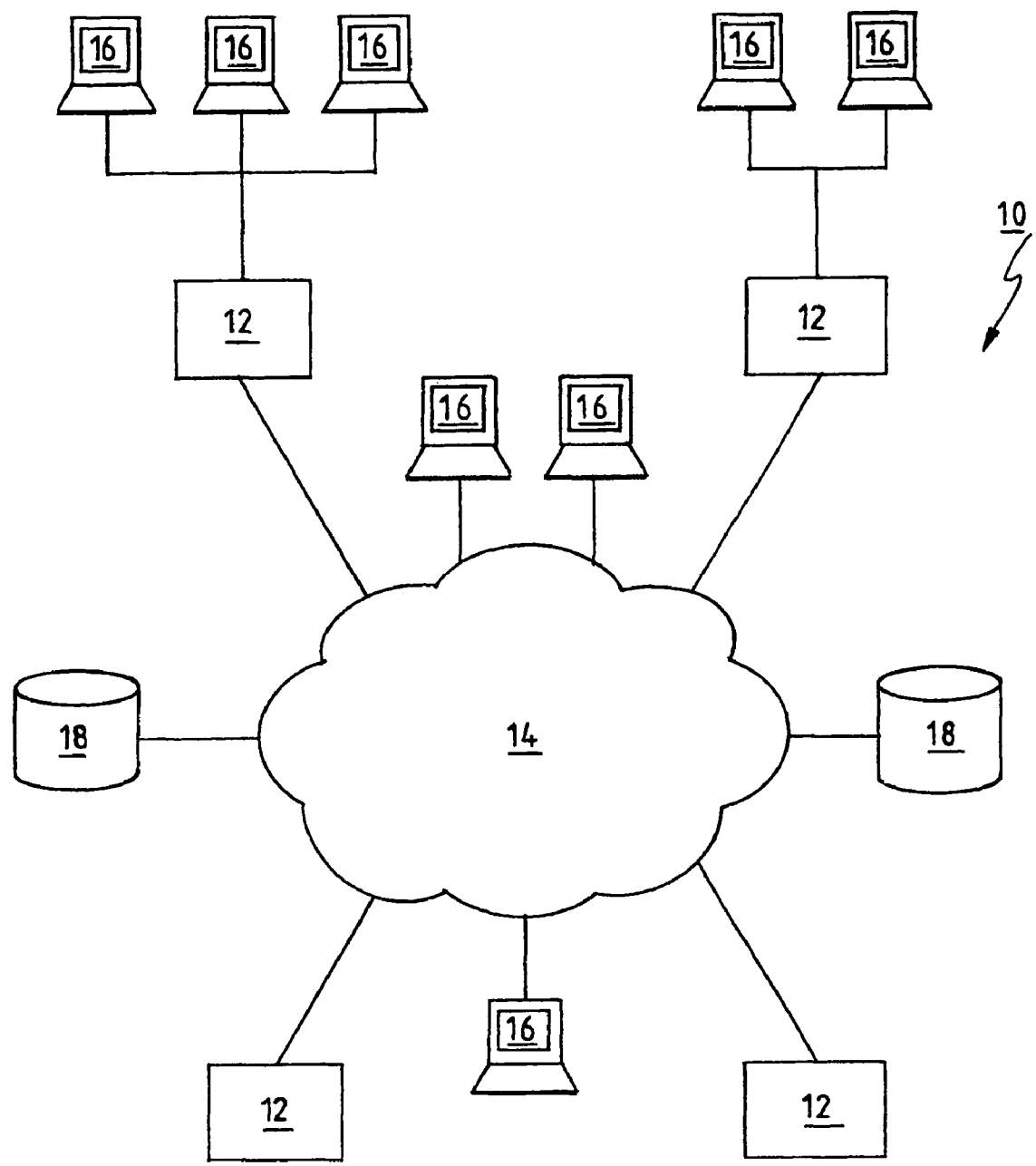
FIG. 1 is a functional block diagram of a computer system in which the method of the invention can be employed.

Referring to FIG. 1, there is shown a block schematic representation of a computer network 10 comprising a plurality of computer devices 12 interconnected by a network 14 (represented by a cloud in the figure). Network 14 may comprise a Local Area Network (LAN), a Wide Area Network (WAN), the Internet or any suitable interconnection means. Some of the computing devices 12, which may comprise PCs, servers or the like, have associated therewith a plurality of user or subscriber devices (such as PCs) 16 while other user devices 16 are connected directly to network 14. According to one embodiment, user devices 16 comprise PCs. Network 14 may also include data storage devices 18 such as databases.

Figure 2:
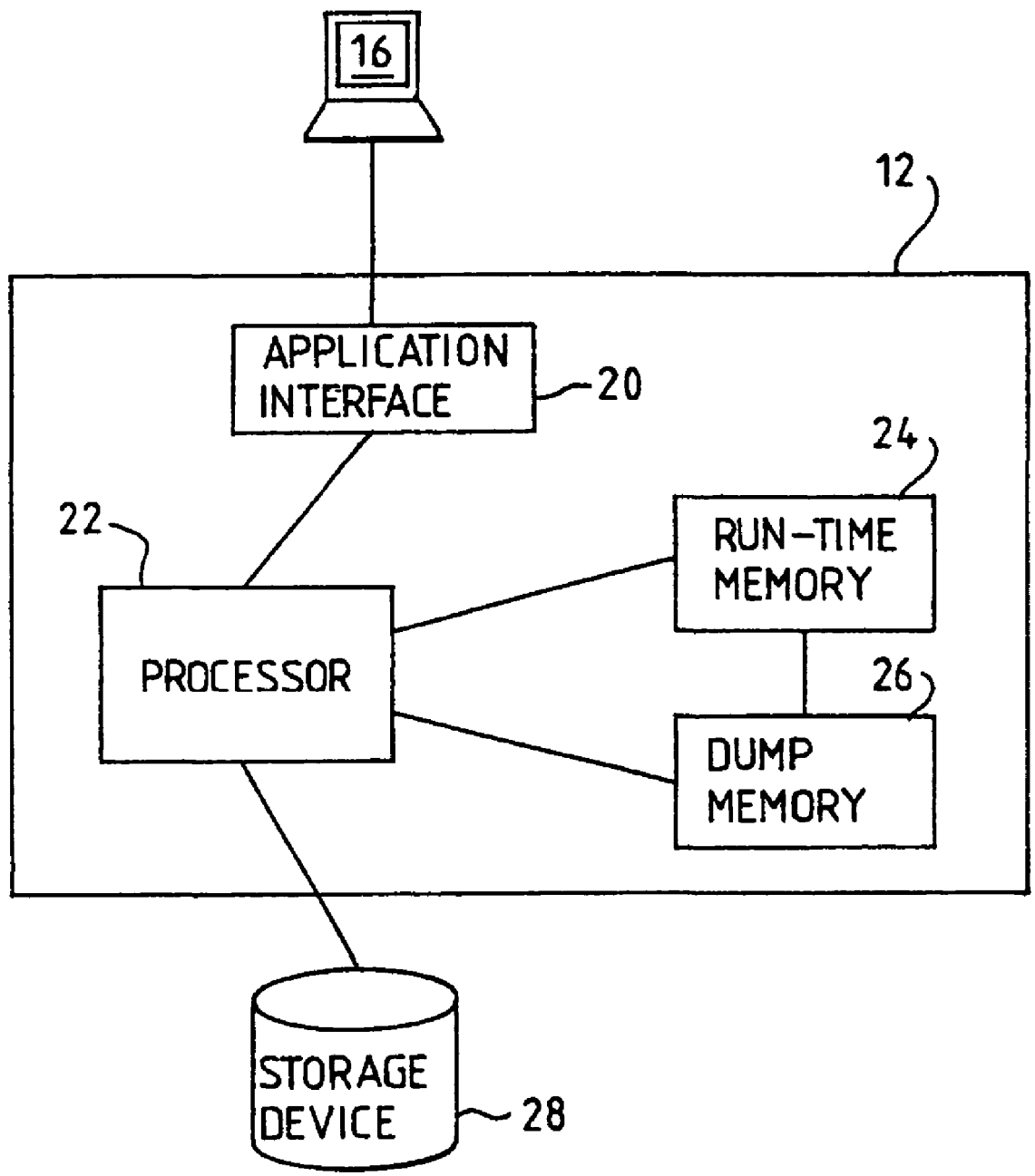
FIG. 2 is a functional block diagram of a computing device of the computer system of FIG. 1.

As can be seen from FIG. 2, each of the computing devices 12 comprises an application interface 20 through which users 16 can invoke the execution of application programs. Each computing device 12 has at least one processor 22 for executing invoked application programs. Associated with processor 22 is a run-time memory 24 for temporarily storing application program run-time data (logical objects) and a dump memory 26 to which the contents of the run-time memory can be copied under control of a data-copying application program or a sub-routine of an application program. Run-time memory 24 and dump memory 26 may comprise a single, integral memory device suitably partitioned or separate memory devices as illustrated. Run-time memory 24 and/or dump memory 26 may be located remotely from computing device 12 or may be co-located therewith as illustrated. The data-copying application may be invoked automatically at a system level or by any other suitable means. Computing devices 12 may also have local storage media 28 such as hard disks, soft disks, magnetic tape drivers, or the like associated therewith, and these may comprise the dump memory in some instances. User devices 16 may have a similar structure to computing devices 12.

Not withstanding the foregoing nor the following description of a method of copying data in accordance with embodiments of the present invention, such embodiments are applicable to any memory copying process in a computer system where run-time access by currently running application programs is required to the memory or any part of it that is being copied.

Figure 3:
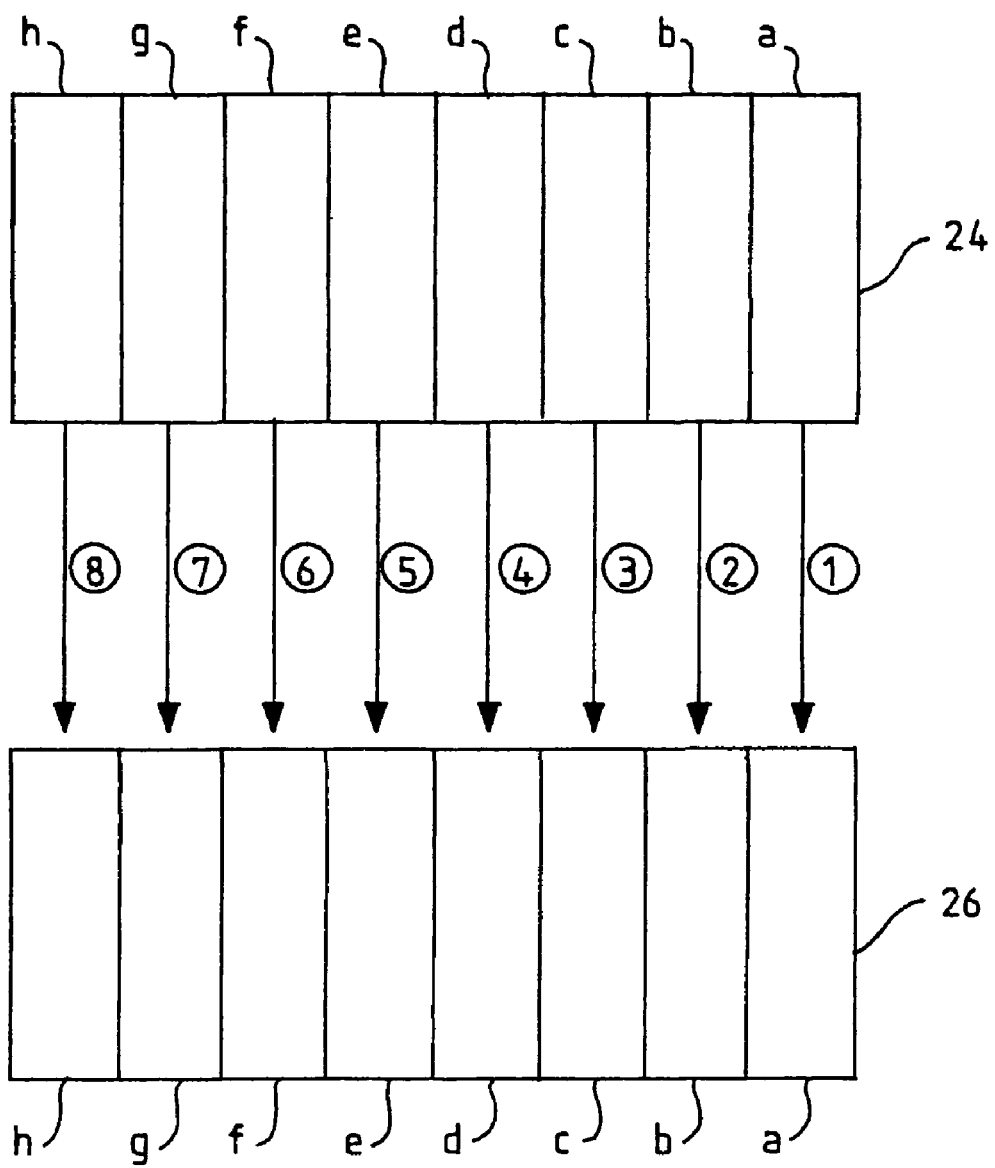
FIG. 3 is a schematic representation of a process of copying data from a run-time memory to a dump memory in the computer system of FIG. 1.

Referring now to FIG. 3, each of run-time memory 24 and dump memory 26 is shown, for ease of illustration only, to be divided into eight data-storing segments or regions called "grains." In the case of run-time memory 24, grains 24a-h temporarily store run-time data, i.e. logical objects, for application programs being executed by processor 22. In order to obtain a point-in-time image of the run-time data, it is only necessary to copy data from run-time memory grains 24a-h to corresponding grains 26a-h in dump memory 26 (or any other suitable memory or storage device or non-transitory computer-readable medium (e.g., a hard disk, a portable diskette, an erasable programmable read-only memory (EPROM) device, a soft disk, tape, random access memory (RAM), read-only memory (ROM), a solid-state memory device, a flash memory device, a portable compact disk read-only memory (CD-ROM), an optical fibre, and the like memories)).

It will be understood that the correspondence between grains 24a-h in run-time memory 24 and those of dump memory 26 is a logical correspondence rather than a physical one. However, although such a data-copying process may take only a few milliseconds in a real system, some of the data may be updated/modified by its associated application program if such program is allowed to access its data in run-time memory 24 during the data-copying process thus corrupting the point-in-time data image being formed.

The conventional method of preventing corruption of point-in-time data image of the run-time memory data is to pause or stop all associated application programs prior to and for the duration of the dumping (data-copying) process to prevent any of such data being updated/modified during the data-copying process. This leads to processor downtime as has already been discussed herein which is undesirable.

A novel data-copying process of the present invention comprises dumping (copying) data of discrete run-time memory grains 24a-h before the data stored therein is modified by an associated application program while still allowing the application program to access such data in run-time memory in order to update/modify it. Consequently, data-copying process embodiments of the present invention remove the necessity of pausing or stopping applications while a data dump is taking place and thus enables uninterrupted service to be maintained.

As illustrated in FIG. 3, a data-copying process embodiment of the present invention comprises sequentially dumping data stored in grains 24*a-h* of run-time memory 24 to corresponding grains 26*a-h* in dump memory 26. The sequential data-dumping process begins with copy operation 1 (denoted by arrowed line 1 in the figure) which copies data in a first grain 24*a* of run-time memory 24 to the first grain 26*a* of dump memory 26. The depicted data-copying process proceeds with copy operations 2, 3, etc., until all data content of run-time memory 24 has been copied to dump memory 26, thus providing a complete point-in-time data image of run-time memory 24. However, in the process illustrated by FIG. 3, where a currently running application program decides to update a data entry in grain 24*f* of run-time memory 24, then prior to allowing the program to update the data entry, the data-copying program or sub-routine causes data in that grain 24*f* to be dumped out of sequence (copy operation 4) to a corresponding grain 26*f* in dump memory 26 before returning to the sequential dumping process of copy operations 5, 6, 7, 8, as illustrated.

Figure 4:
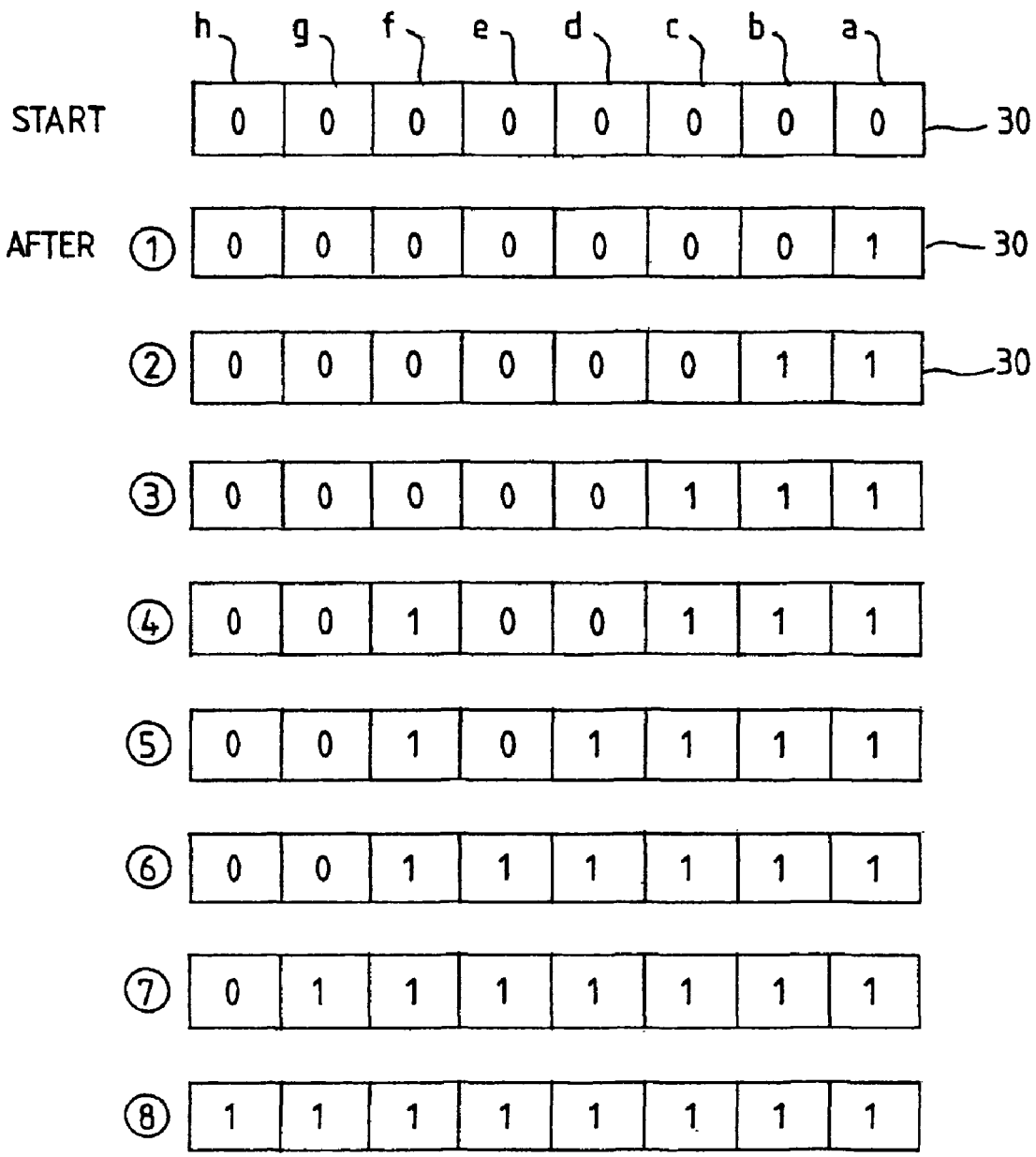
FIG. 4 is a schematic representation of a bit-map associated with the run-time memory of FIG. 3.

Referring also to FIG. 4, run-time memory 24 has a bit-map or bit-array 30 associated therewith. Bit-map 30 comprises an array of bits 30*a-h* stored in run-time memory 24 or any other suitable memory device. Bits 30*a-h* of bit-map 30 have a logical correspondence with grains 24*a-h* of run-time memory 24. The state of a bit in bit-map 30 represents the dump state of a corresponding run-time memory grain. For example, if a bit is set to "0", the data in that grain has not yet been dumped, but if it is set to "1", the data in that grain has been dumped. FIG. 4 illustrates the state of bits 30*a-h* in bit-map 30 at the beginning of a data-copying instance and after each of the copy operations 1 to 8.

When a dump is required, bit-map 30 is cleared and a pointer is set to point to a "base" or first grain 24*a* of run-time memory 24. Each grain 24*a-h* of run-time memory 24 has an associated pointer value. Dump software (data-copying application) then starts at first grain 24*a* of nm-time memory 24 and dumps data content of the first grain 24*a* (copy operation 1) to a corresponding grain 26*a* of dump memory 26. It then sets a corresponding bit 30*a* in bit-map 30 to "1" to indicate that data of first grain 24*a* has been copied during the current data-copying instance. The data-copying application then moves on to second grain 24*b* and repeats the process until the data content of last grain 24*h* is dumped.

According to one embodiment, before dumping the data content of a grain, the data-copying application checks a corresponding bit in bit-map 30 to determine whether data content of that grain has already been dumped during that data-copying instance. If the corresponding bit in bit-map 30 is set to show that the data content of that grain has already been dumped during that data-copying instance, then a dump of the data content of that grain and setting of a corresponding bit in bit-map 30 to "1" is skipped.

In the example illustrated in FIG. 3, the data content of grain 24*f* of run-time memory 24 is dumped out of sequence (copy operation 4). Consequently, following copy operation 6 (where data content of grain 24*e* is dumped to a corresponding grain 26*e* in dump memory 26), the data-copying application reaches grain 24*f*. At this point, however, a check of a corresponding bit 30*f* in bit-map 30 indicates that data content of grain 24*f* has already been dumped in that data-copying instance and, thus, the data-copying application skips grain 24*f* and progresses to grain 24*g* (copy operation 7). Bit-map 30 thereby provides a mechanism of ensuring that data content of a grain that has already been dumped and then updated/modified by its application program is not dumped again which would corrupt a point-in-time data image being formed.

In the present invention therefore, while a data-copying instance is progressing, applications can continue to run and update their memory contents because the data content of a grain is dumped before the application is allowed to perform a data entry update and a corresponding bit in a bit-map is set to prevent updated data content of that grain being dumped during that data-copying instance.

Figure 5:
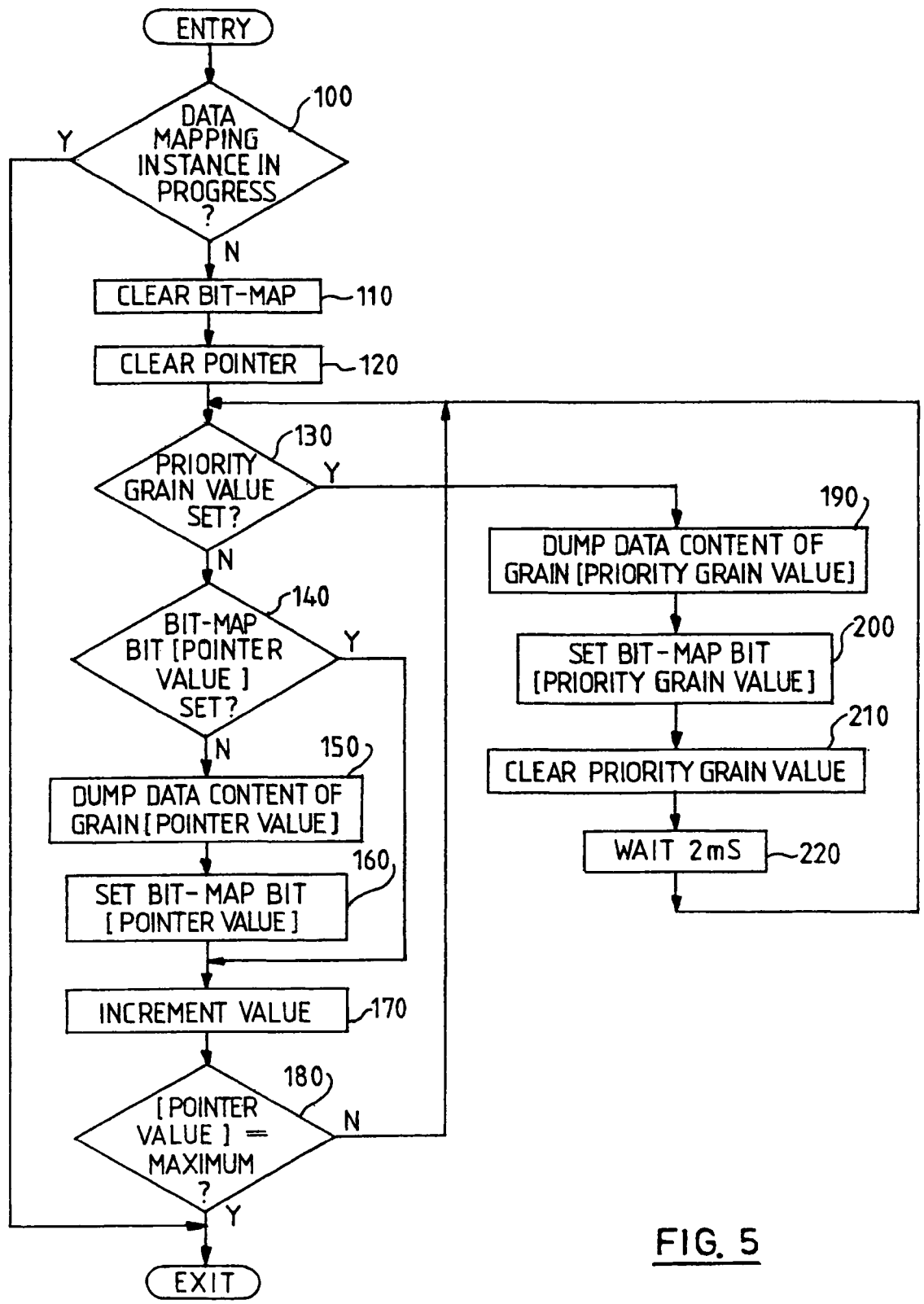
FIG. 5 is a flowchart illustrating a data-copying process in accordance with the invention.

A data-copying process in accordance with an embodiment of the invention is better illustrated by the flow diagram of FIG. 5. Initially, a determination is made as to whether a data-copying instance is in progress (process block 100). In the event that a data-copying instance is determined to be in progress, no new data-copying instance is initiated and the depicted process exits.

In the event that a data-copying instance is determined not to be in progress, then a data-copying instance is initiated by clearing a corresponding bit-map (e.g., to set all bits to "0" to show that data contents of corresponding run-time memory grains have not yet been dumped to a dump memory). Thereafter, a pointer is cleared so that it points to a first base grain of run-time memory. Once the described pointer is cleared, a determination is made as to whether the pointer is pointed to a priority grain (process block 130) by checking whether the pointer value is now set to a priority grain value indicating that a running program has decided to update a data entry in the grain identified as the priority grain.

In the event that the described pointer is not set to a priority grain value, the pointer remains pointing to the first grain. For that grain, a determination then is made as to whether a corresponding bit-map bit is set for that grain (process block 140). In the event that the corresponding bit-map is not set, i.e., the data content of that grain has not previously been dumped in the current data-copying instance, then data content of that grain is copied to a corresponding grain in the dump memory (process block 150). The corresponding bit in the bit-map is then set to show that the data content of the grain has now been dumped in this data-copying instance (process block 160) and the pointer is incremented (process block 170). If it is determined that the pointer value is at a maximum value (process block 180), then the data-copying instance is complete and the data-copying application terminates. The dump memory then contains a point-in-time data image of the run-time memory.

If it is determined that the pointer is not at its maximum value, then operations indicated by process blocks 130 through 170 are repeated for an incremented pointer value corresponding to a next run-time memory grain.

Where it is determined that a bit-map bit for a grain is set to show that its data content has already been copied in the current data-copying instance, then data dumping and bit-map setting may be skipped, and the process continues to increment the pointer. This situation would arise where data content of a grain is copied to dump memory out of sequence as will be described below.

Where it is determined that a priority grain value has been set, the priority grain state indicates that an application program having access to its logical objects stored in run-time memory has decided to update an entry in an associated grain which is ahead of the leading edge of the dump sequence. Thereafter, data content of the priority grain is dumped out of sequence to a corresponding grain in dump memory (process block 190) prior to the running program being allowed to update the data entry. The bit-map bit for the priority grain is then set (process block 200) to indicate that its content has been dumped during this data-copying instance and the priority grain value is subsequently cleared (process block 210). Thereafter, a time delay (for example, 2 milliseconds) is allowed to pass (process block 210) before the application returns to determine if a (e.g., incremented) pointer is set to a priority grain value. The described time delay provides an opportunity for a second priority grain value to be set after data content of a first priority grain has been dumped without returning to dumping the data content of in-sequence grains in-between.

As an optional operation following the determination that the priority grain value is set, the bit-map bit for the priority grain is checked to determine if it is set. If the described bit-map bit is set, then the data-copying application proceeds, thus skipping the dumping of priority grain data content (process block 190) and setting of the bit-map bit for the priority grain value (process block 200). This optional operation avoids the possibility of an updated data content of a grain being dumped to dump memory should a second or same data entry in that grain 24*f* be updated/modified on a second occasion during the data-copying instance.

Figure 6:
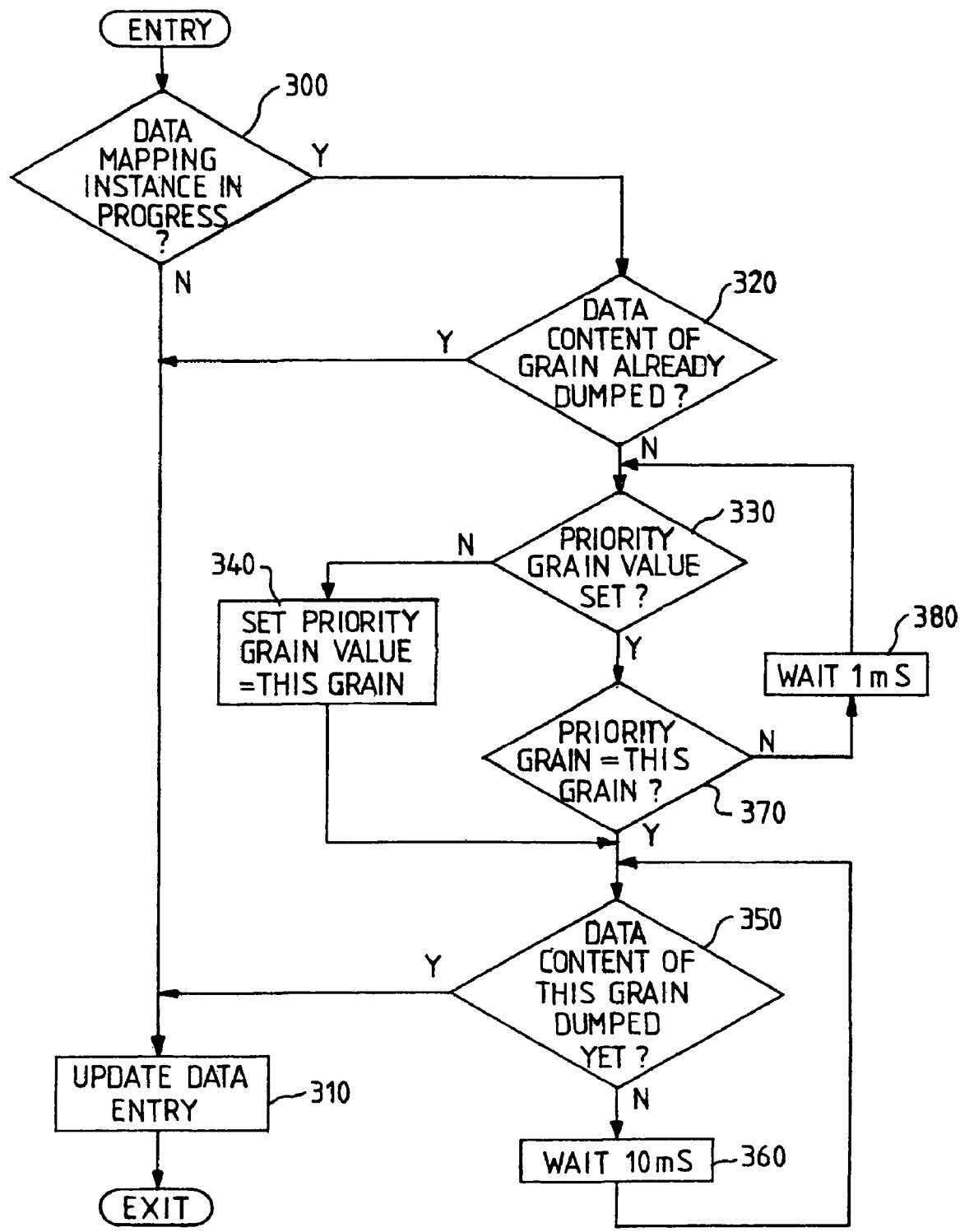
FIG. 6 is a flowchart illustrating a data updating process in accordance with the invention.

Referring now to FIG. 6, a method of updating a data entry in a discreet grain of run-time memory by an application being executed by a processor is illustrated. Initially, a determination is made as to whether a data-copying instance is in progress (process block 300). Where it is determined that no data-copying instance is in progress, the application program updates data entries in an associated logical object stored in a discreet grain of run-time memory (process block 310) and then exits the routine.

In the case where it is determined that a data-copying instance is in progress, a determination is made of whether data content of the discreet grain has already been dumped as part of the current data-copying instance (process block 320) by checking the bit in a bit-map corresponding to the discreet grain). Where it is determined that data content of the discreet grain has already been dumped, the application program proceeds to update (process block 310) the data entry in the discreet grain before exiting the routine.

In determining that the data entry of a discreet grain has not already been dumped during the current data-copying instance, as a next operation, a determination is made as to whether a priority grain value is set (process block 330) and, if not, the priority grain value is made the value of the discreet grain (process block 340). Following this, the data content of the discreet grain is dumped to a corresponding grain in dump memory (e.g., in accordance with the process illustrated by FIG. 5) and, to confirm this, a determination is made (process block) 350) as to whether the dumping of the data content of the discreet grain is complete. If it is determined that the data content dumping is complete, then the depicted updating function proceeds (process block 310) to update a date entry in the discreet grain. If it is determined that the dumping of data is not complete, then a time delay (e.g., 10 milliseconds) is invoked (process block 350) before the described completion determination is repeated. This time delay affords time for the data-dumping step to be completed.

Where it is determined that the priority grain value is set, a determination is made (process block 370) as to whether the priority grain value is the value of the discreet grain to be updated. If so, then the updating function proceeds to determine whether the dumping of data content of the discreet grain is complete (process block 350). If not, then a time delay (e.g., 1 millisecond) is invoked (process block 380) before it is again determined whether a priority grain value is set (process block 330). This time delay provides time for the dumping of data content of a previous priority grain (set by a different application thread) to be completed. According to one embodiment, while the dumping of data content of the different priority grain is in progress, the present application pauses until the dumping of the data content of the other priority grain is complete.

According to one embodiment, the data entry updating function is intimately linked to the data-copying application and shares a number of the same operations as is apparent from the foregoing.

The data-copying application and data-updating function of embodiments of the present invention may be implemented by software-comprising machine-readable code which is executed by a processor (e.g., processor 22).

In various alternative embodiments, there are a number of different implementations for the update function. In a first implementation, at each point in the software code of an application program where an update to a data entry of a logical object of the program is to be made, the code comprising the update routine is preceded by a test on a global "dumping" flag. If the flag is clear, indicating that no data-copying (dumping) instance is in progress, then the data routine is executed to update the data entry in a conventional manner. However, if the test on the global dumping flag indicates that a data-copying instance is in progress, then a call is made to a dumping function. The dumping function checks a respective bit in a bit-map corresponding to the memory grain containing the data entry to be updated and, where the bit is not set, i.e., the data content of the memory grain has not yet been dumped in the data-copying instance, the data content of the grain is dumped prior to returning to the update routine. This implementation of the update function is simple to implement and has good run-time performance and low overhead for commencing dumping. However, it involves an increase in code space and it can be time-consuming to modify existing software to support this technique.

In a second implementation, code to update a data entry comprises a separate updating function to a data-copying function. This function is called each time an application program decides to update a data entry in run-time memory. When a data-copying instance is in progress, the separate updating function takes the actions necessary to dump the data content of a run-time memory grain prior to a data entry in the grain being updated. When there is no data-copying instance in progress, it simply applies the data-updating step. This implementation of the update function is easier to implement on existing software than the implementation described above and in a software language such as C++ (which supports operator overloading) this would be relatively simple to implement, but would have poorer run-time performance and be potentially confusing to debug.

A third implementation of the updating function comprises using self-modifying code. Each data update function begins with a "Jump" instruction to "normal" update code. This is followed by the execution of code for conditionally dumping a section of run-time memory before applying the required updating operation. At run-time, the normal procedure is to take the Jump and apply the updating step. However, when a data-copying instance is initiated, each Jump instruction is replaced by a no-operation instruction. After the data-copying instance has been completed, the Jump instructions are restored.

Where the source code for the third implementation comprises C++ code, the normal run-time code includes a jump over a call to do_dump() where the dumping function is called do_dump(). Consequently, during normal run-time, the code never reaches the call to do_dump() and execution flow continues with the assignment operation. However, when a dump is initiated, the software which detects the dump trigger (flag) goes through the rest of the software replacing every such jump instruction with a no-op instruction, so that when the relevant section of code is executed, the call to do_dump() is made. When the dump operation is completed, the dumping software needs to go through the rest of the software, replacing the no-op instructions with the pre-existing jump instructions. This implementation offers good run-time performance, but is complicated to implement; involves an increase in code space; and is time-consuming to modify existing software to support this technique.

Where the machine code for implementing the present invention comprises C++ software code, the source code for the three updating function options might comprise:

program run-time without suspending the program's access to its data in the memory during the data-copying and updating processes. In one aspect, the invention concerns a method of copying data from the processor memory to a dump memory during run-time. This comprises determining whether data in a segment of the processor memory is to be updated by the program and copying this data to a corresponding segment in the dump memory prior to the data being updated. The method comprises a data-copying instance for obtaining a point-in-time image of a data content of processor memory while the program is running. In a second aspect, the invention concerns a method of updating a data entry in processor memory. This comprises determining whether a data-copying instance has been initiated to obtain a point-in-time image of data in the processor memory means associated with the running program, and where it is determined that a data-copying instance has not been initiated, updating the data entry.

```
/*************************************************************************/
/* Sample file containing code to demonstrate the principles of the */
/* 'flash-dump' process
*/
/* The example chosen is to add a to b, leaving the result in a */
/*************************************************************************/
bool dumping = FALSE;
/*****************/
/* Option 1 code */
/*****************/
void main( )
{
    int a;
    int b;
    if (dumping)
    {
        do_dump( );
    }
    a = a + b;
}
/*****************/
/* Option 2 code */
/*****************/
void mam( )
{
    int a;
    int b;
    add(a,b);
}
void add(int a, int b)
{
    int a_seg;
    if (dumping)
    {
        do_dump( );
    }
    a = a + b;
}
/*****************/
/* Option 3 code */
/*****************/
void main( )
{
    int a;
    int b;
    jump just_do_the_sum; /* Replaced by a no-op when dumping is in progress */
    do_dump( )
just_do_the_sum: a = a + b;
}
```

It will be understood that the above examples of source code are provided by way of example only.

In summary, the present invention relates to methods of copying and updating data in a processor memory during

What is claimed is:

1. A method of copying data from a first memory device to a second memory device with a computer system during a program run-time, said method comprising:

establishing a plurality of segments within said first memory device;

establishing within said second memory device an equal number of segments as in said first memory device;

establishing a data structure defining a sequential segment order for said plurality of segments within said first memory device;

copying data within said segments of said first memory device to corresponding segments of said second memory device according to said sequential segment order by referencing to said data structure prior to said data have been modified;

thereafter, in response to a need to modify data in a particular segment out-of-sequence from said sequential segment order prior to arriving to said particular segment, copying data from said particular segment to a corresponding segment within said second memory device;

determining a next segment within said segments of said first memory device for copying in accordance with said sequential segment order;

resuming copying of data within said segments of said first memory device to corresponding segments of said second memory device according to said sequential segment order beginning with said next segment until said particular segment is reached;

skipping said particular segment upon reaching said particular segment in said sequential segment order after said data in said particular segment is copied to said corresponding segment within said second memory device; and resuming copying data within said segment of said first memory device in accordance with said sequential segment order at a segment following said particular segment after skipping said particular segment.

2. The method of claim 1, wherein said method further includes obtaining a point-in-time image of data content of said first memory device utilizing a data-copying instance.

3. The method of claim 1, wherein said method further includes determining whether or not said particular segment having data need to be modified by checking a priority grain value bit.

4. The method of claim 1, wherein said method further includes:

copying data in a segment of said first memory device to a corresponding segment of said second memory device in response to checking a bit within a bit-map corresponding to said segment indicating that said data has not already been copied during operation of that copying instance; and setting said bit within said bit-map to indicate that the data in said segment has been copied in response to said copying.

5. The method of claim 4, wherein said method further includes:

inhibiting copying of data within said segment of said first memory device to a corresponding segment of said second memory device in response to said bit within said bit-map corresponding to said segment indicating that said data has been previously copied during operation of that copying instance.

6. A non-transitory computer-readable medium encoded with a computer program for execution by a processor for implementing a method of copying data from a first memory device to a second memory device within a computer system during a program run-time, said computer-readable medium comprising:

computer program code for establishing a plurality of segments within said first memory device;

computer program code for establishing within said second memory device an equal number of segments as in said first memory device;

computer program code for copying data within said segments of said first memory device to corresponding segments of said second memory device according to said sequential segment order by references to said data structure prior to said data having been modified;

computer program code for, thereafter, in response to a need to modify data in a particular segment out-of-sequence from said sequential segment order prior to arriving to said particular segment, copying data from said particular segment to a corresponding segment within said second memory device;

determining a next segment within said segments of said first memory device for copying in accordance with said sequential segment order;

computer program code for resuming copying of data within said segments of said first memory device to corresponding segments of said second memory device according to said sequential segment order beginning with said next segment until said particular segment is reached;

computer program code for skipping said particular segment upon reaching said particular segment in said sequential segment order after said data in said particular segment is copied to said corresponding segment within said second memory device; and computer program code for resuming copying data within said segment of said first memory device in accordance with said sequential segment order at a segment following said particular segment after skipping said particular segment.

7. The non-transitory computer-readable medium of claim 6, wherein said computer-readable medium further includes computer program code for obtaining a point-in-time image of data content of said first memory device utilizing a data-copying instance.

8. The non-transitory computer-readable medium of claim 7, wherein said computer-readable medium further includes computer program code for determining whether or not said particular segment having data need to be modified by checking a priority grain value bit.

9. A method for copying data stored in a first memory including a first plurality of segments having a sequential order to a second memory including a second plurality of segments, each segment in said second plurality of segments corresponding with a respective segment in said first plurality of segments, said method comprising:

copying data in a first portion of said first plurality of segments into a corresponding first portion of said second plurality of segments in said sequential order;

receiving an indication that a computer program intends to update a first segment in said first plurality of segments that has not been copied into said second plurality of segments and is sequentially after a second portion of said first plurality of segments, said second portion of said first plurality of segments sequentially positioned between said first portion of said first plurality of segments and said first segment;

copying first data in said first segment into a corresponding second segment in said second plurality of segments prior to copying any data in said second portion of said first plurality of segments into a corresponding second portion of said second plurality of segments;

copying said second portion of said first plurality of segments into said corresponding second portion of second plurality of segments in sequential order; and copying a third portion of said first plurality of segments into a corresponding third portion of second plurality of segments in sequential order, said third portion of said first plurality of segments sequentially positioned after said first segment.

10. The method of claim 9, further comprising resuming said sequential order of copying said data in each of said first plurality of segments into said second plurality of segments after said first data is copied to said second segment.

11. The method of claim 10, further comprising:
determining that said first data has been copied into said second segment when said sequential order reaches said first segment; and
skipping said first segment in said sequential order in response to said determination that said first data has been copied into said second segment.

12. The method of claim 11, further comprising copying data in a next segment in said sequential order of said third portion of said first plurality of segments immediately after skipping said first segment.

13. The method of claim 11, further comprising resuming said sequential order of copying said data in said third portion of said first plurality of segments into said corresponding third portion of said second plurality of segments after said first segment is skipped.

14. A non-transitory computer-readable medium encoded with a computer program for execution by a processor for implementing a method for copying data stored in a first memory including a first plurality of segments having a sequential order to a second memory including a second plurality of segments, each segment in said second plurality of segments corresponding with a respective segment in said first plurality of segments, said computer-readable medium comprising:
computer code for copying data in a first portion of said first plurality of segments into a corresponding first portion of said second plurality of segments in said sequential order;
computer code for receiving an indication that a computer program intends to update a first segment in said first plurality of segments that has not been copied into said second plurality of segments and is sequentially after a second portion of said first plurality of segments, said second portion of said first plurality of segments sequentially positioned between said first portion of said first plurality of segments and said first segment;
computer code for copying first data in said first segment into a corresponding second segment in said second plurality of segments prior to copying any data in said second portion of said first plurality of segments into a corresponding second portion of said second plurality of segments;
computer code for copying said second portion of said first plurality of segments into said corresponding second portion of second plurality of segments in sequential order; and
computer code for copying a third portion of said first plurality of segments into a corresponding third portion of second plurality of segments in sequential order, said third portion of said first plurality of segments sequentially positioned after said first segment.

15. The non-transitory computer-readable medium of claim 14, further comprising computer code for resuming said sequential order of copying said data in each of said first plurality of segments into said second plurality of segments after said first data is copied to said third segment.

16. The non-transitory computer-readable medium of claim 15, further comprising:
computer code for determining that said first data has been copied into said third segment when said sequential order reaches said first segment; and
computer code for skipping said first segment in said sequential order in response to said determination that said first data has been copied into said third segment.

17. The non-transitory computer-readable medium of claim 16, further comprising computer code for copying data in a next segment in said sequential order of said first plurality of segments immediately after skipping said first segment.

18. The non-transitory computer-readable medium of claim 16, further comprising computer code for resuming said sequential order of copying said data in each of said first plurality of segments into said second plurality of segments after said first segment is skipped.

* * * * *